US009849825B2

(12) United States Patent
Salami, Jr.

(10) Patent No.: US 9,849,825 B2
(45) Date of Patent: Dec. 26, 2017

(54) LIGHT SYSTEM FOR USE WITH A HITCH RECEIVER

(71) Applicant: Joseph D Salami, Jr., Westwood, MA (US)

(72) Inventor: Joseph D Salami, Jr., Westwood, MA (US)

(*) Notice: Subject to any disclaimer, the term of this patent is extended or adjusted under 35 U.S.C. 154(b) by 0 days.

(21) Appl. No.: 14/966,477

(22) Filed: Dec. 11, 2015

(65) Prior Publication Data

US 2016/0167568 A1    Jun. 16, 2016

Related U.S. Application Data

(63) Continuation-in-part of application No. 29/513,586, filed on Jan. 2, 2015, now Pat. No. Des. 763,484, and a continuation-in-part of application No. 29/534,506, filed on Jul. 29, 2015, now Pat. No. Des. 777,954.

(60) Provisional application No. 62/090,703, filed on Dec. 11, 2014, provisional application No. 62/211,202, filed on Aug. 28, 2015.

(51) Int. Cl.
| | | |
|---|---|---|
| *B60Q 1/30* | (2006.01) | |
| *B60Q 1/00* | (2006.01) | |
| *B60Q 1/04* | (2006.01) | |
| *B60Q 1/24* | (2006.01) | |

(52) U.S. Cl.
CPC ......... *B60Q 1/0035* (2013.01); *B60Q 1/0088* (2013.01); *B60Q 1/0483* (2013.01); *B60Q 1/24* (2013.01); *B60Q 1/305* (2013.01)

(58) Field of Classification Search
CPC .. B60Q 1/0035; B60Q 1/0076; B60Q 1/0088; B60Q 1/0483; B60Q 1/24; B60Q 1/2661; B60Q 1/30; B60Q 1/305
See application file for complete search history.

(56) References Cited

U.S. PATENT DOCUMENTS

| | | | |
|---|---|---|---|
| 6,379,028 B1 | 4/2002 | Crouse et al. | |
| 6,409,367 B1 | 6/2002 | Pratt | |
| 6,788,190 B2 | 9/2004 | Bishop | |
| 6,883,945 B1 * | 4/2005 | Gonzalez | B60Q 1/2661 362/485 |
| 6,886,968 B1 * | 5/2005 | Hamelink | B60D 1/58 280/163 |
| 6,977,584 B2 | 12/2005 | Milliken | |
| 7,008,088 B2 | 3/2006 | Pisciotti | |
| 7,498,686 B2 | 3/2009 | Capenos | |
| RE40,878 E | 8/2009 | Bishop | |

(Continued)

*Primary Examiner* — Thomas M Sember
(74) *Attorney, Agent, or Firm* — Onello & Mello, LLP

(57) ABSTRACT

Provided is a vehicle light system that can be usefully attached to a hitch receiver. The light system includes one or more lights attached to a frame. The frame includes a substantially horizontal central member, substantially vertical left and right members extending upward from the central member, and left and right extensions respectively coupled to the left and right members, each of the left and right extensions including at least one light. A hitch post extends from the frame and is configured to mount to the hitch receiver of a vehicle. The system can include an insulated power cord having a first end coupled to the one or more lights and a second end having a plug configured to connect to a power source of the vehicle. The one or more lights can be controlled by one or more switches, e.g., integrated with the frame or lights.

20 Claims, 9 Drawing Sheets

(56) References Cited

U.S. PATENT DOCUMENTS

| | | | |
|---|---|---|---|
| 8,552,852 B1 | 10/2013 | Hertz et al. | |
| 2004/0156205 A1* | 8/2004 | Pisciotti | B60Q 1/305 |
| | | | 362/485 |

* cited by examiner

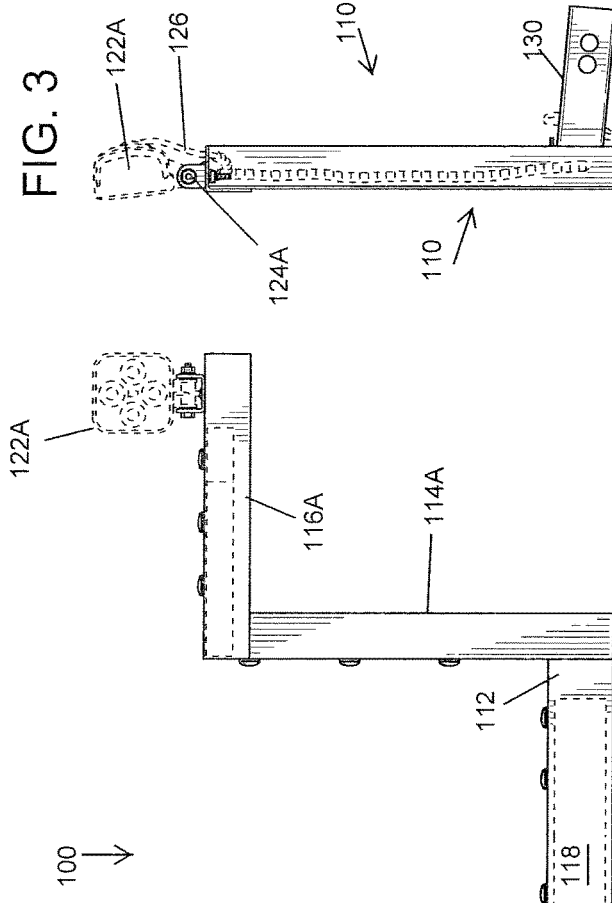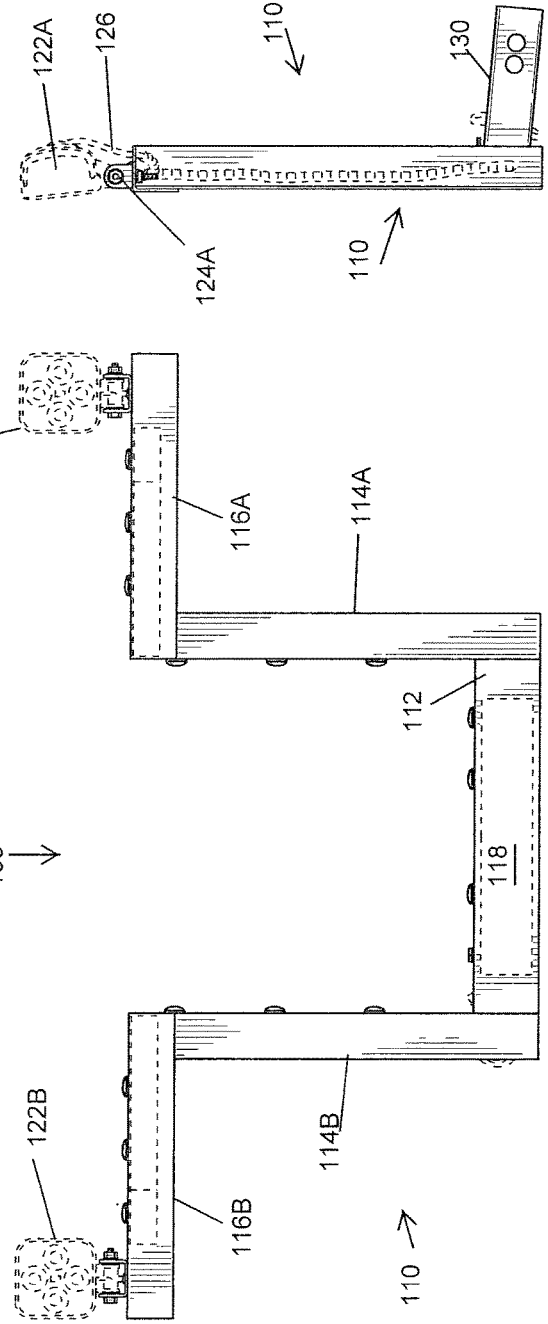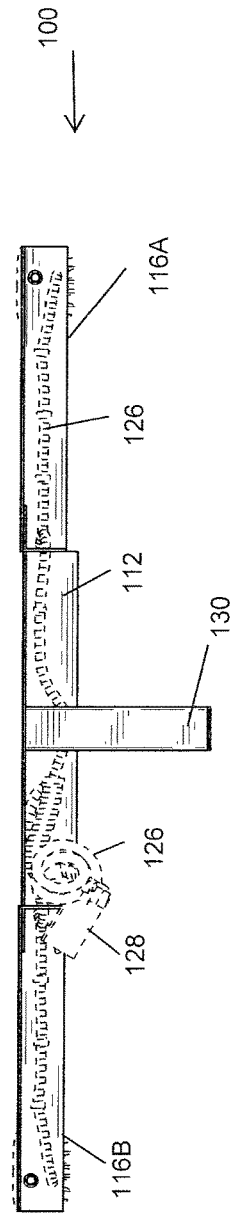

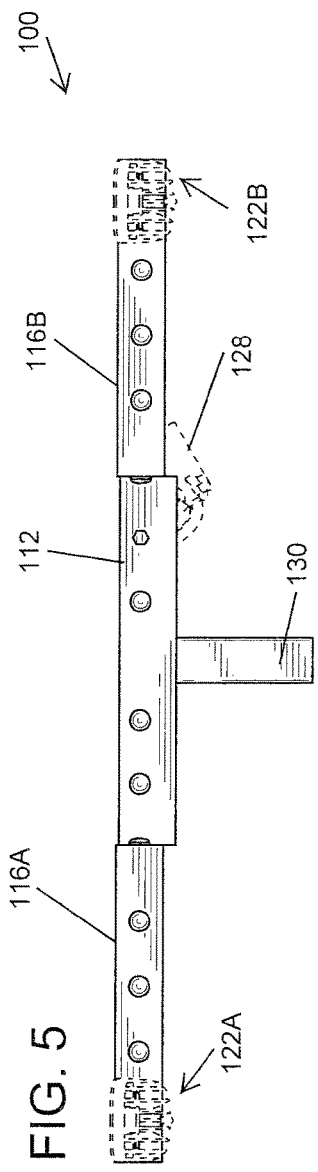
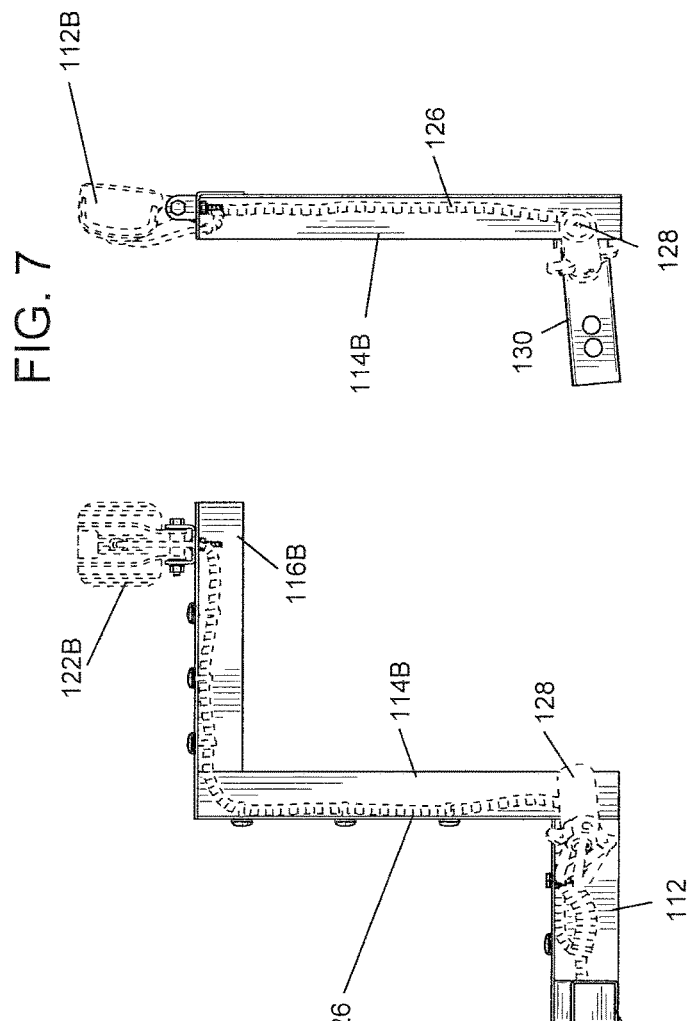
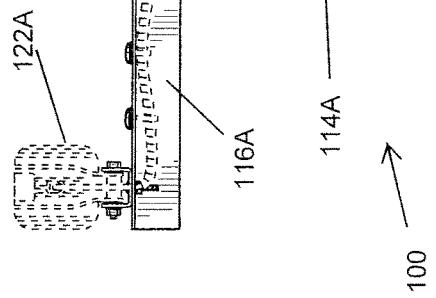

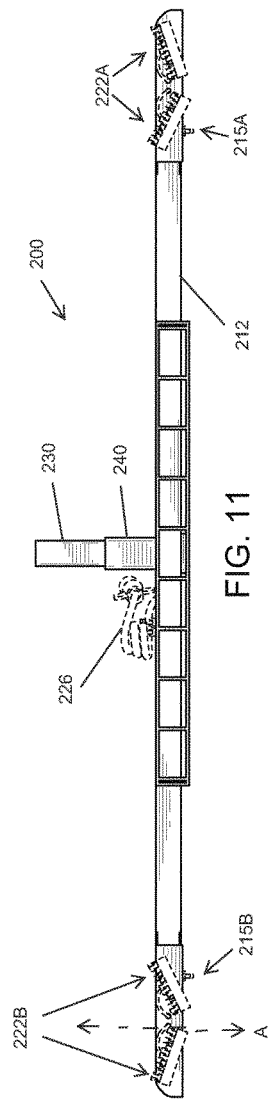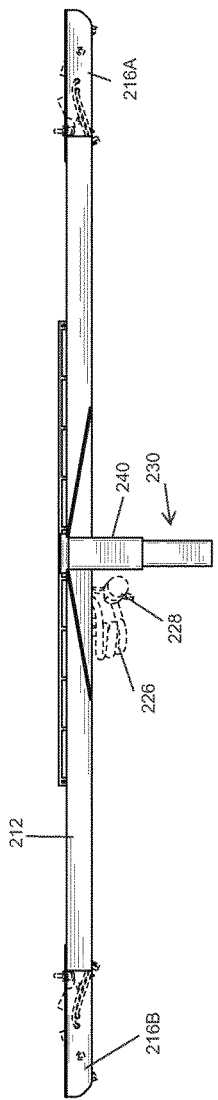

LIGHT SYSTEM FOR USE WITH A HITCH RECEIVER

CROSS REFERENCE TO RELATED APPLICATIONS

The present application claims priority under 35 USC 119(e) to U.S. Provisional Patent Application No. 62/090,703 filed Dec. 11, 2014, entitled REAR VEHICLE LIGHT SUPPORT, ASSEMBLY AND SYSTEM and U.S. Provisional Patent Application No. 62/211,202 filed Aug. 28, 2015, entitled REAR VEHICLE LIGHT SUPPORT, ASSEMBLY AND SYSTEM, the contents of which are incorporated herein in their entirety.

The present application is a continuation-in-part of commonly-owned U.S. Design patent application No. 29/513,586, filed Jan. 2, 2015, entitled VEHICLE REAR-MOUNTED LIGHT APPARATUS, and U. S. Design patent application No. 29/534,506, filed Jul. 29, 2015, entitled VEHICLE LIGHT APPARATUS, the contents of which are incorporated herein in their entirety.

FIELD OF INTEREST

The present inventive concepts relate to the field of lighting systems, and more particularly to the field of lighting systems useful with vehicles or work equipment.

BACKGROUND

Some vehicles are used as equipment necessary in the performance of a service, while other vehicles are used for personal uses. With particular regard to vehicles used as equipment, such vehicles may be used in a wide variety of conditions, including conditions with low light and/or low visibility.

In colder climates, snowplowing is one example of a vehicle used as equipment. Such a vehicle can be a pickup truck or similar vehicle, as an example. It is quite common for snowplowing to be performed during the evening or early morning hours, that is, overnight between dusk and dawn. It is also common for snowplowing to be performed during heavy snow conditions, when visibility is poor.

Additionally, in a wide variety of construction trades, it is common to use a vehicle as equipment. These vehicles can be used at any time of year, and any time of day. For example, these vehicles can also be used in darkness or in other conditions of low visibility.

Many vehicles used as equipment, such as for snowplowing or in the trades, have adequate lighting at the front, such as headlights, fog lights, or other forward facing lights. Snowplows, which can block head lights, can have attached lights. However, lighting for the rear of the vehicle is very limited. It would be beneficial to have a light support, assembly or system that can easily and removably attached to the rear of the vehicle to provide rear lights, e.g., rear facing lighting.

SUMMARY

In accordance with one aspect of the present inventive concept, provided is a light system configured to mount to a rear hitch receiver of a vehicle and to support one or more lights.

In various embodiments, the system can include an insulated power cord and a plug configured to connect to a power cord of the vehicle.

In various embodiments, the system can be configured to define an opening to avoid occlusion of a license plate or rear center camera or the vehicle.

In various embodiments, the at least one light can face rearward.

In various embodiments, the at least one light can face at least partially sideways.

In various embodiments, the center member can be a center horizontal support.

In various embodiments, the left and right extensions extend outwardly from the left and a right vertical members.

In some embodiments, the left and right extensions can be substantially horizontal.

In various embodiments, the one or more lights can be a plurality of lights and each light can be independently controllable.

In various embodiments, the one or more lights can be a plurality of sets of lights and each set of lights can be independently controllable.

In various embodiments, the vertical members can be extendible.

In various embodiments, the horizontal extensions can be foldable.

In various embodiments, the system can include at least one rearward facing reflector.

In accordance with one aspect of the present inventive concept, provided is a light system, comprising a frame, one or more lights coupled to left and right members of the frame, and a hitch post extending from the frame in a first direction. The hitch post is configured to mount to a hitch receiver, e.g., of a vehicle. The left and right members of the frame extend upward from a central member of the frame.

In various embodiments, the system further comprises an insulated power cord having a first end coupled to the one or more lights and a second end having a plug configured to connect to a power source of the vehicle.

In various embodiments, an orientation of the one or more lights is adjustable.

In various embodiments, at least one light is coupled to each of the left and right members.

In various embodiments, the one or more lights comprise halogen lights and/or LED lights.

In various embodiments, the one or more lights is a plurality of lights, including one or more independently controllable lights.

In various embodiments, the one or more lights is a plurality of sets of lights, including one or more independently controllable sets of lights.

In various embodiments, the one or more lights are configured to be illuminated in one or more of a plurality of states, including an on state, one or more strobe states, one or more color states, one or more flashing states, and/or one or more illumination pattern states.

In various embodiments, the system further comprises at least one reflector coupled to the frame.

In various embodiments, the frame defines an opening between the left and right members that avoids occlusion of a license plate of the vehicle when the hitch post is coupled to the hitch receiver of the vehicle.

In various embodiments, the system further comprises a swivel attachment configured to rotate the frame with respect to the hitch post.

In various embodiments, the swivel attachment is configured to rotate the frame toward a ground surface when the hitch post is coupled to the hitch receiver of the vehicle.

In various embodiments, the swivel attachment is configured to rotate the support away from a tailgate, trunk, or rear door of the vehicle.

In various embodiments, the center member is a substantially horizontally oriented when the hitch post is coupled to the hitch receiver of the vehicle.

In various embodiments, the left and right members extend from the center member in a substantially vertical direction with respect to the center member.

In various embodiments, the center member has a width in a range of about 4 feet to 6 feet.

In various embodiments, the left and right members are extendible between a first position and one or more extended positions.

In various embodiments, the left and right members respectively comprise left and right extensions, each of the left and right extensions including at least one light.

In various embodiments, the system further comprises one or more removable work lights, including at least one light coupled to a support member and at least one clamp that couples the support member to the frame.

In various embodiments, the system further comprises a hitch receiver configured to receive a hitch post.

In accordance with another aspect of the inventive concept, provided is a vehicle light system, comprising a frame, which includes a substantially horizontal central member and left and right members extending upward from the central member. The system further includes a hitch post extending from the frame in a first direction and configured to mount to a hitch receiver of a vehicle, one or more lights coupled to the left and right members, an insulated power cord having a first end coupled to the one or more lights and a second end having a plug configured to connect to a power source of the vehicle, and at least one switch configured to selectively control the illumination of the one or more lights. The frame defines an opening between the left and right members that avoids occlusion of a license plate of the vehicle when the hitch post is coupled to the hitch receiver of the vehicle.

In accordance with another aspect of the inventive concept, provided is a light support, assembly, kit, and/or system as shown and described.

In accordance with another aspect of the inventive concept, provided is a vehicle comprising a rear vehicle light assembly as shown and described.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 2 is a front view of the light system of FIG. 1;

FIG. 3 is a right side view of the light system of FIG. 1;

FIG. 4 is a bottom view of the light system of FIG. 1;

FIG. 5 is a top view of the light system of FIG. 1;

FIG. 6 is a rear view of the light system of FIG. 1;

FIG. 7 is a left side view of the light system of FIG. 1;

FIG. 11 is a top view of the light system of FIG. 8;

FIG. 12 is a bottom view of the light system of FIG. 8;

DETAILED DESCRIPTION OF PREFERRED EMBODIMENTS

Figure 1:
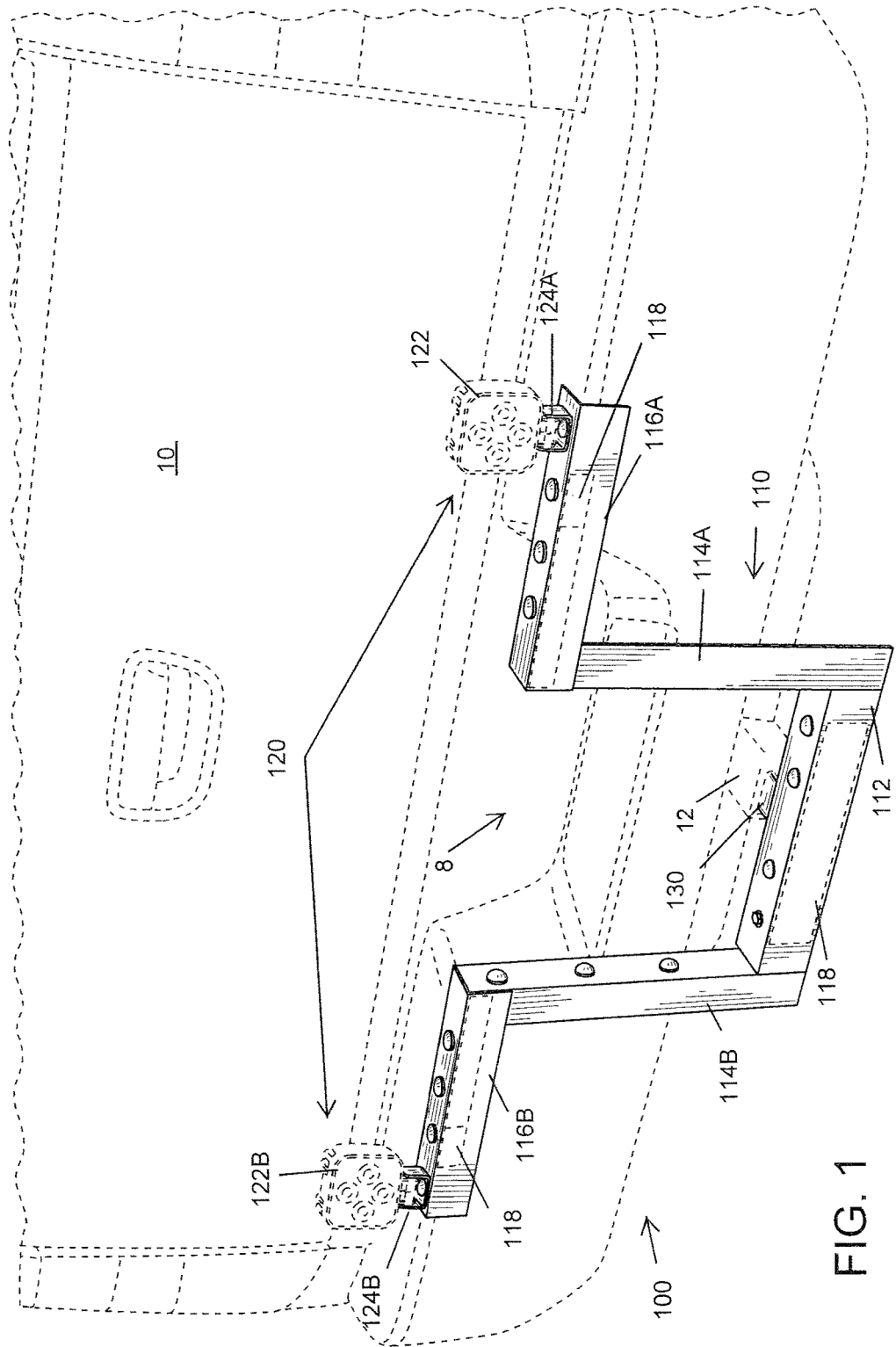
FIG. 1 is an isometric view of an embodiment of a light system, in accordance with aspects of the inventive concept.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the term's first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

When the word "substantially" is used as a qualifier of a term or concept, it is generally meant to indicate that variations are permitted and intended to fall within the scope of such term or concept so qualified. Such variations are generally intended to be limited to those that would not fundamentally alter the structure or function of the claimed inventive concept.

In accordance with aspects of the present invention, provided is a light system, apparatus, and/or kit configured to be coupled to a hitch receiver, such as those found at the rear of different types of vehicles, e.g., trucks, automobiles, sport utility vehicles, and the like. In various embodiments, the system includes a frame supporting one or more lights and a hitch post configured to connect to a standard trailer hitch receiver, such as those often provided at the rear of a vehicle. In the preferred embodiment, the hitch post is structured to couple to a standard receiver hitch, such as a standard 2" receiver hitch. To the extent that different types of vehicles or equipment also include a hitch receiver, the light system may also be useful with such other types of vehicles or equipment. The light system may also include a power connector configured to couple with a standard power connector of the vehicle, such as those provided in conjunction with the trailer hitch. However, in other embodiments, the lights can be powered differently, such as by battery, solar cell, our other power source not requiring a physical connection.

The light system is preferably configured to easily attach and detach from the trailer hitch receiver of a vehicle for easy and convenient use. Even when mounted to the vehicle, the light system can preferably be used to selectively illuminate a wide range of areas around the vehicle, through user-selected orientation of different ones of the one or more lights 120. As examples, different lights can be moved to illuminate one or more selected area around the vehicle, e.g., within a range of 200 degrees (or more) laterally around the vehicle, a ground area, an area above the vehicle, or combinations thereof. Thus, in various embodiments, the light system can be used to project light rearward, and optionally have the ability to manipulate one or more of the lights to achieve light projections in other directions (e.g., sideways, up, down, and so on). The light system can be used, for example, as work lighting at a job site.

FIG. 1 is an isometric view of an embodiment of a light system 100 coupled to a hitch receiver 12 at the rear of a vehicle 10, in accordance with aspects of the inventive concept. FIGS. 2-7 show different views of the light system 100 of FIG. 1. In particular, with respect to the light system 100 of FIG. 1: FIG. 2 is a front view, FIG. 3 is a right side view, FIG. 4 is a bottom view, FIG. 5 is a top view, FIG. 6 is a rear view, and FIG. 7 is a left side view.

In a less than fully assembled form, the vehicle light assembly 100 can be referred to a light kit that could then be fully assembled to form the light system 100. The ability to at least partially unassemble or reduce the profile of the light system can be useful for storage, for example.

The light system 100 includes a frame 110, which is preferably made of a durable, rigid steel, although other materials with similar strength and durability qualities could also suffice in some embodiments. The frame 110 includes a center member 112, a right member 114A, and a left member 114B. The right and left members 114A,B extend upwardly from the center member 112. In this embodiment, the right and left members 114A,B are oriented at about 90 degrees with respect to a horizontal axis, which runs through the substantially straight the center member 112. This orients the right and left members 114A, B substantially vertically when the light system is mounted to the hitch receiver 12 of vehicle 10. In other embodiments, however, the right and left members 114A,B can be oriented at different angles with respect to the horizontal axis and center member 112. For example, in some embodiments, the right and left members 114A, B can be oriented at an angle between 45 degrees and 135 degrees with respect to the horizontal axis.

The center member 112 is shown as being substantially straight and aligned along the horizontal axis in this embodiment. However, in other embodiments the center member could be other than straight, e.g., include one or more curves, angled members, and so on. Similarly, the right and left members 114A, B are shown has being substantially straight, but in other embodiments could be other than straight, e.g., include one or more curves, angled members, and so on. For example, the right and left members could be curved to bow outwardly.

In the embodiment depicted in FIGS. 1-7, the light system 100 includes a right extension 116A coupled to or otherwise extending from a top portion of the right member 114A. Similarly, the light system 100 includes a left extension 116A coupled to or otherwise extending from a top portion the left member 114B. The right and left extensions 116A, B can be considered part of the frame 110. In this embodiment, the right and left extensions 116A, B lie in second substantially horizontal axis, parallel to the first horizontal axis discussed above. However, in other embodiments, the right and left extensions 116A, B can be oriented at an angle with respect to the second horizontal axis. Such angle can be between 0 and 360 degrees, or more preferably between 0 and 180 degrees.

In some embodiments, the right and left extensions 116A, B can rigidly extend from the right and left members 114A, B. In other embodiments, each of the right and left extensions 116A, B can be attached by a hinge to a respective right and left members 114A, B, so the right and left extensions 116A, B can fold down against the right and left extensions 114A,B, as an example. The ability to fold the right and left extension members 116A, B can be useful for reducing the profile of the light system 100 when not in use and/or for storage, as examples.

In other embodiments, the right and left extensions 116A, B can be part of an extension bar (not shown) that spans the gap between the right and left members 114A, B.

In some embodiments, such as that shown in FIG. 1, the center member 112 is about 14" long, the left and right members 114A, B are about 16" long, and the left and right horizontal extension members 116A, B are about 12" long. However, different dimensions may suffice in other embodiments, and additional structural members could be used in other embodiments. Preferably, the dimensions and orientations of the center member 112, right and left members 116A, B, and right and left extensions (if included) are chosen to avoid obstruction of a license plate/back-up camera area when mounted to a typical road vehicle, e.g., a car, a SUV, or a truck.

The light system 100 includes one or more lights 120 attached or coupled to the frame 110. The one or more lights 120 can include one or more individual lights or one or more sets of lights, where a set of lights can include two or more lights. In this embodiment, the one or more lights 120 includes light 122A and light 122B attached to the right and left extensions 116A, B, respectively. In other embodiments, e.g., where right and left extensions 116A, B are not included, the lights 122A and 122B can attached to the right member 114A and the left member 114B, respectively. In other embodiments, additional structural members and/or lights could be used and coupled to or integral with the frame 110.

In some embodiments, the lights are on a swivel, post, hinge, or other manipulatable coupling or connector 124A and 124B that enables the lights to be selectively oriented to illuminate in any of a variety of directions, e.g., rearward, frontward, sideward, upward, downward, or any of a variety of directions between orientations.

In some embodiments, the one or more lights 120 can include one or more halogen and/or LED lights. In some embodiments, the one or more lights 120 can include traditional light bulbs, and/or other lights known to one skilled in the art or hereafter developed. The one or more lights 120 can be a plurality of lights, as shown, and can include one or more independently controllable lights—such as by one or more switches. Such one or more switches can form part of a light, be integral with the frame, and so on. The one or more lights 120 can, therefore, include one or more independently controllable sets of lights. The light system 100 can, therefore, optionally include individual light switches so that a user can turn the lights on/off individually. In other embodiments, one switch can control one or more sets of lights. In other embodiments, one switch can control all of the lights. Preferably, any switches used are waterproof switches. In still other embodiments, there can be no switches included in the light system; the lights can be controlled by the power source or the vehicle 10.

The one or more lights 120 can be configured to be illuminated in one or more of a plurality of states, including an on state, one or more strobe states, one or more color states, one or more flashing states, and/or one or more illumination pattern states.

The lights system 100 also includes a hitch post 130. The hitch post 130 may be mounted or connected to the frame 110, e.g., the center member 112 of frame 110, such as by welding for example. In this embodiment, the hitch post 130 is configured to attach to the hitch receiver 12 of the vehicle 10. In this embodiment, the hitch receiver 12 is a standard receiver currently available in the art. Many types of vehicles include such a hitch receiver 12. The hitch post 130 is configured to slide into the hitch receiver 12, as would a standard hitch. The hitch post 130 is preferably configured to be secured within the hitch receiver by any standard approach and apparatus, such as by a pin or lock. As such, a vehicle with a standard hitch receiver can receive the light system 100.

In some embodiments, the hitch post 130 is secured in the receiving hitch and the frame 110 maintains the structure for rearward facing lights for use, e.g., as rear snowplow or reverse lights or as work lights—depending on the embodiment. The hitch post 130 can also be multi-drilled with different holes so it will fit multiple hitch receivers, vehicles, and applications. The light system 100 is configured to be secured to the hitch receiver of the vehicle, so the vehicle can be driven and used with the light system attached.

FIG. 4 is a bottom view of the vehicle light system 100 of FIG. 1. In this view, there is shown a power cord 126 having a connector or plug 128, such as a standard "RV connector." The power cord 126 and plug 128 are used to supply power to the one or more lights 120. The power cord 126 may be attached to the frame, or maintained substantially within the frame 110 to generally avoid damage to the power cord 126.

In some embodiments, the power cord 126 is an insulated power cord, able to supply power in different weather conditions, such as rain and/or snow. The plug 128 may fit into a corresponding power connector or outlet, such the RV connector often provided at the back of a vehicle with a hitch. Other forms of acceptable power connector or outlet include, but are not limited to, a cigarette lighter, a wall outlet, a battery, or any other source of power known to one skilled in the art.

In some embodiments, the connector or plug 128 includes a set of prongs arranged to correspond with different lines in a vehicle plug (known in the art), where the connections achieve different vehicle power arrangements, such as with an RV connector and plug. For example, one of the prongs can be configured to power the lights as vehicle reverse lights, i.e., only on when the vehicle is in reverse. This is useful in situations where the lights are used while the vehicle is driven. Another prong can be configured to supply power via a switch and be turned on at the operator's discretion. Another prong can be configured to power the lights when the vehicle's taillights are one. This latter connection may be used when the lights are used as work lights, e.g., with the vehicle parked. Different power schemes could be used depending on how the rear lights are to be used. These different scenarios can be implemented through the arrangement of prongs in the plug 128 of the power cord 126 forming part of the light system 110.

The light system 100 may optionally include one or more reflectors 118, e.g., attached to one or more surfaces of the frame 110. As examples, the reflectors could be attached to the center member 112, the right member 114A, the left member 114B, the right extension 116A, and/or the left extension 116B. Such reflectors 118 can be included for safety reasons, particularly if the light system is coupled to a hitch receiver at the rear of a vehicle. The reflectors 118 can include one or more rearward facing reflectors, e.g., for drivers behind the vehicle 10.

In preferred embodiments, the frame 110 is preferably structured and arranged so that it does not block a rear license plate/back-up camera area 8 of the vehicle 10. To accomplish this, the frame 110 may define an opening that does not obstruct area 8 of the vehicle. In this embodiment, when the light system 100 is mounted to a hitch receiver 12 of vehicle 10, the center member 112 is below area 8 and the right and left members 114A, B are to the right and left of the area 8, respectively. As a result, the license plate of the vehicle, as well as any back-up camera located in such area, remain unobstructed by the light system 100.

In this embodiment, the frame 110 is structured such that the lights 122A and 122B are mounted at a height above the ground that is higher than the license plate area 8 of the vehicle when the light system 100 is mounted to the hitch receiver 12 of the vehicle 10. For snowplowing, it can be advantageous to have the lights 122A, 122B at a height that is higher than the height of a snowplow, so that backing into a snowplowed snow bank would not cause the lights to impact the packed snow.

In some embodiments, the lights 120 or the frame 110 could be made to swivel. For example, frame 110 (with lights 120) could be made to swivel down toward the ground surface or out toward one side. This could help remove the light system 100 from the path of a tailgate or rear door when opened.

In various exemplary forms, the light system 100 can be characterized by one or more of the following features:
  a. Made with heavy duty ⅛" (or more) steel for longevity
  b. Square tubing steel 3/16" or ¼"
  c. Bead welded, not tack welded for superior construction
  d. Insulated wire connectors used for moisture elimination e. Open bracket style used to allow visual access for the license plate per state requirement as well as open view for vehicles equipped with a backup camera
f. Standard 2" trailer receiver required
g. Heavy 7 prong "RV" style connector with coiled wiring for ease of connection no matter where the receptacle is on the vehicle
h. Higher light mount to lower the chance of hitting lights previously mounted under vehicle
i. Light construction so it is an easy mount and dismount
j. 700 Lumen LED lights or greater (e.g. 5000 lumen) used Those skilled in the art will appreciate that the inventive concept is not inherently limited by the above features, materials, and/or dimensions. Rather, the above are provided as examples, based on one or more potential exemplary embodiments.

Figure 8:
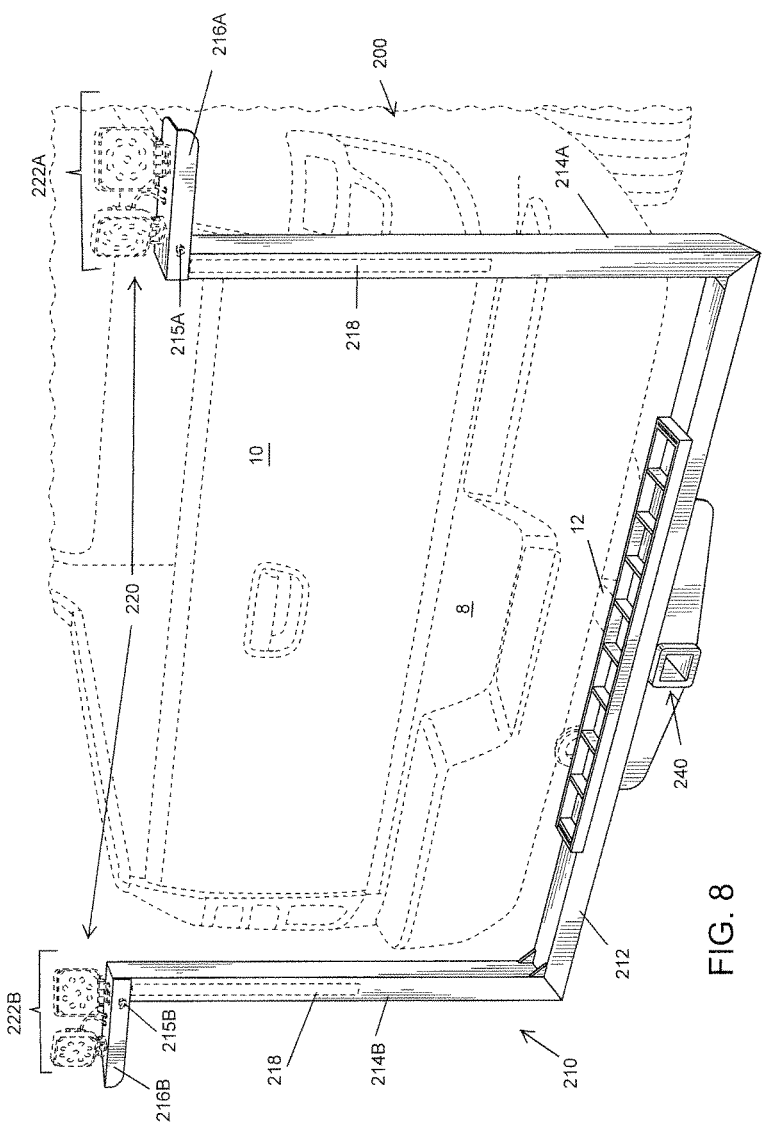
FIG. 8 is an isometric view of another embodiment of a light system, in accordance with aspects of the present invention.
Figure 9:
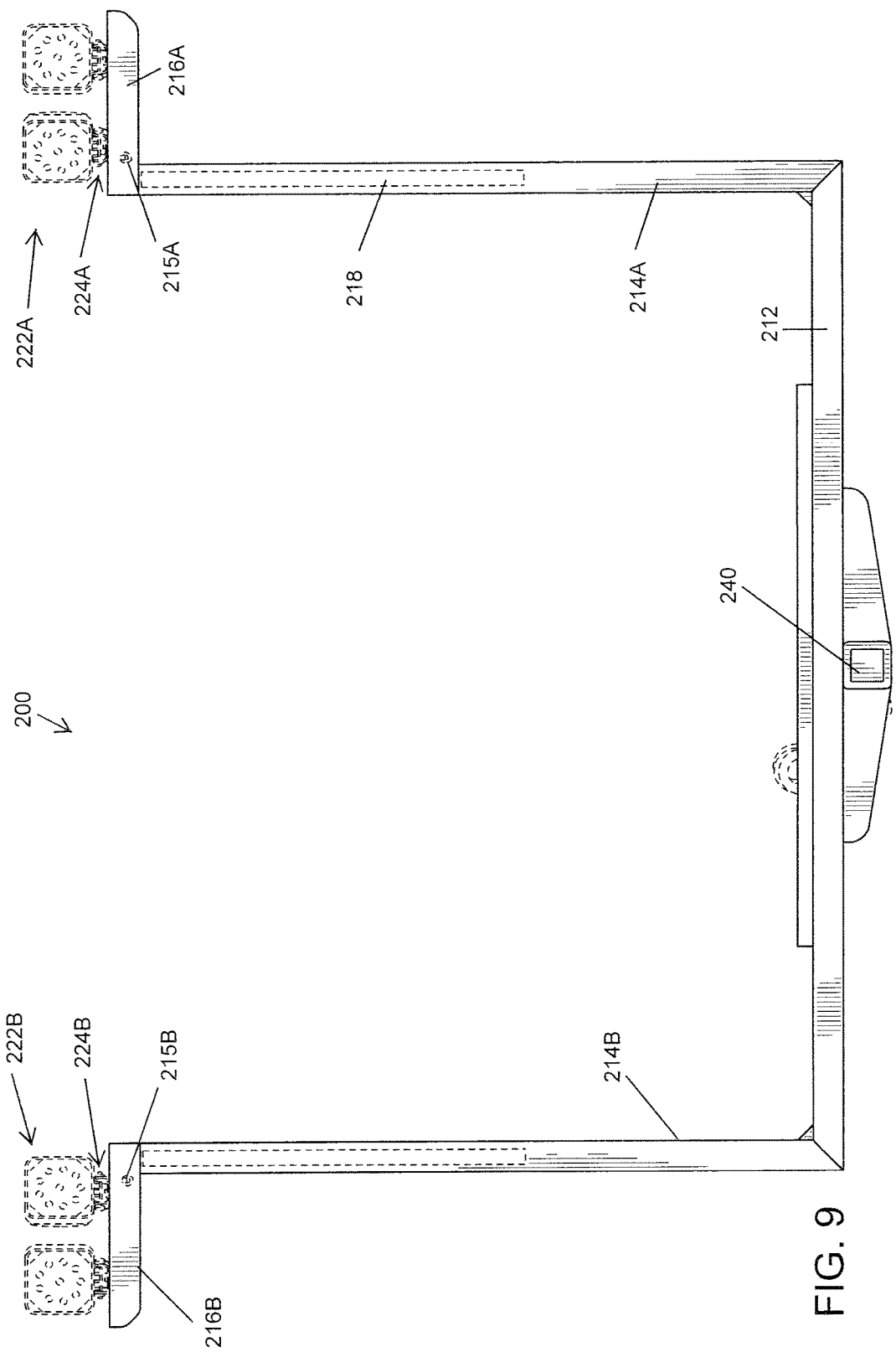
FIG. 9 is a front view of the light system of FIG. 8.
Figure 10:
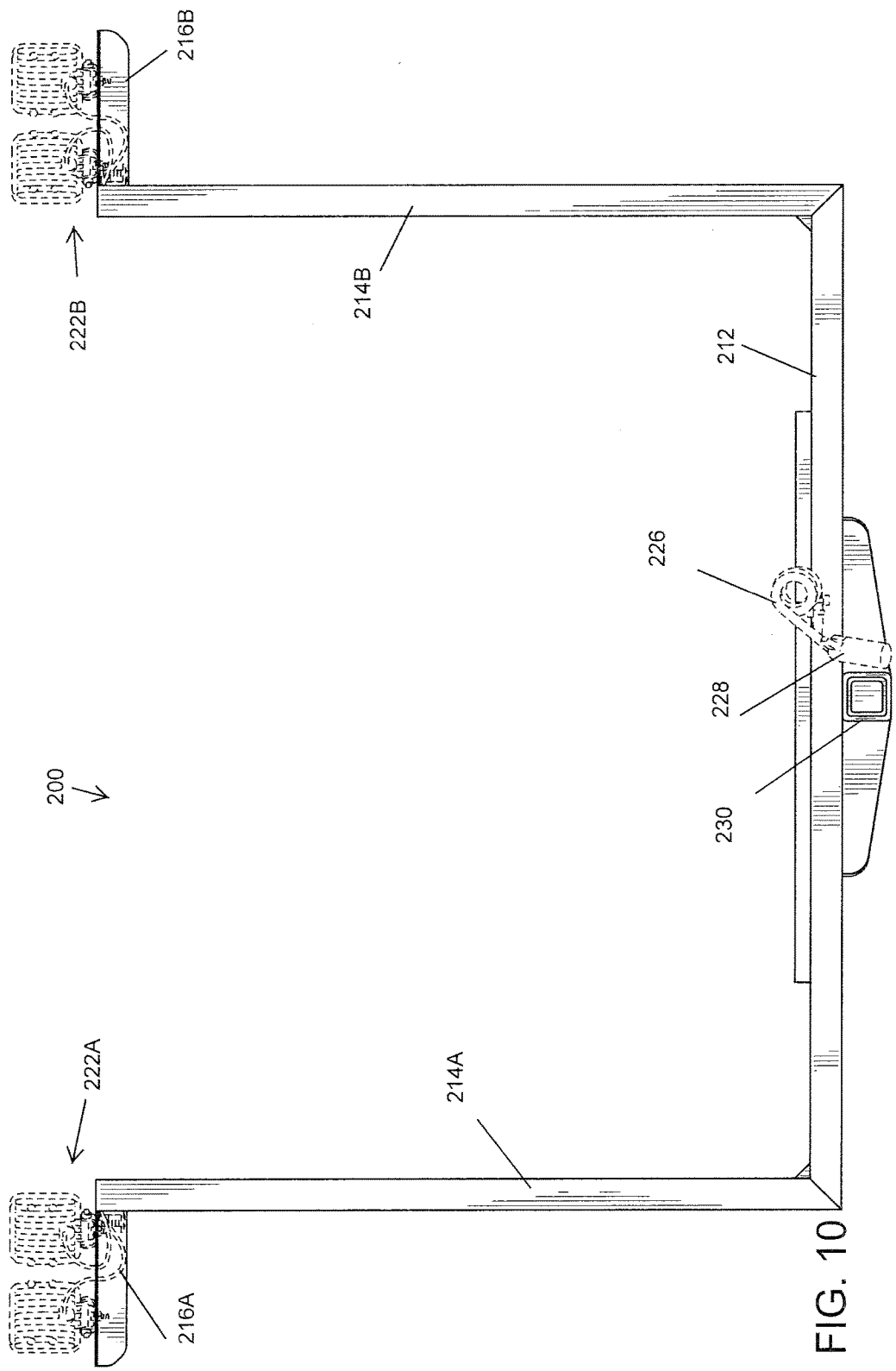
FIG. 10 is a rear view of the light system of FIG. 8.
Figure 13:
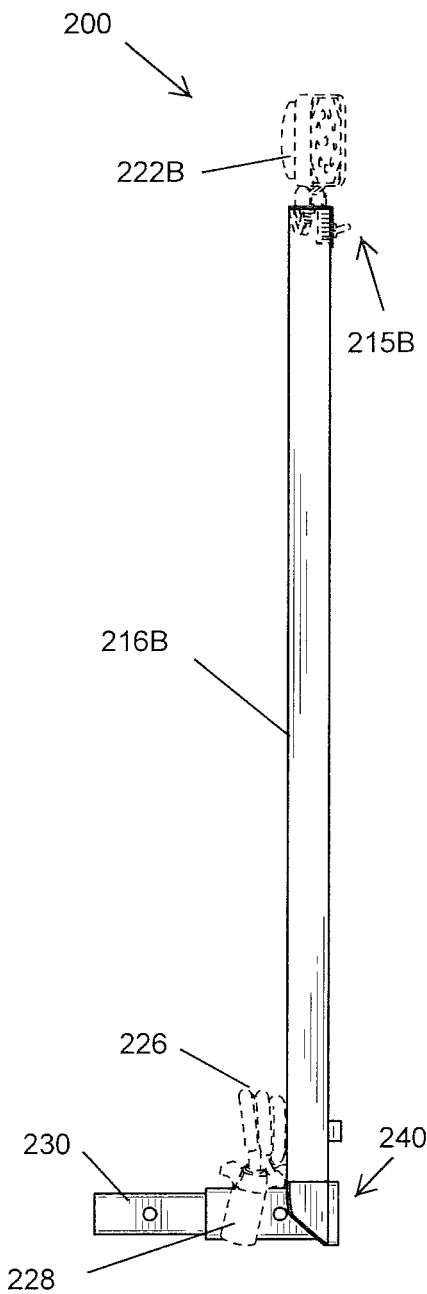
FIG. 13 is a left side view of the light system of FIG. 8.
Figure 14:
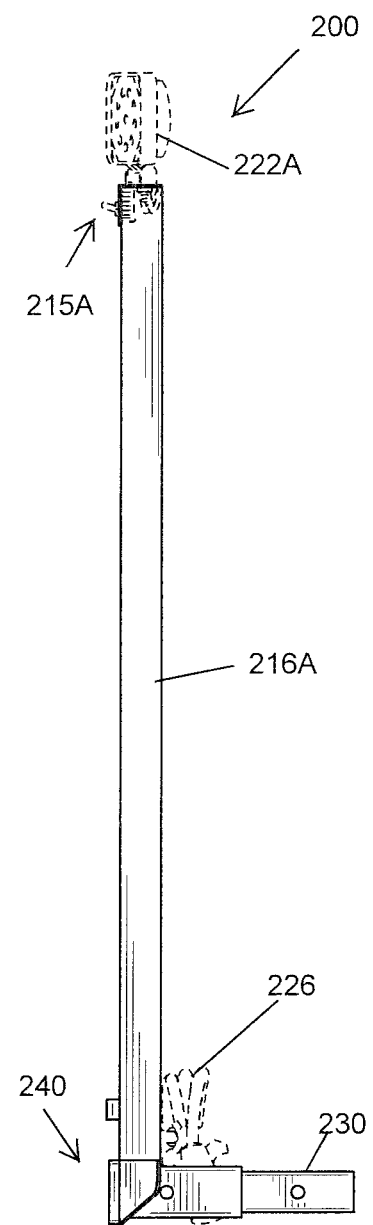
FIG. 14 is a right side view of the light system of FIG. 8.

FIG. 8 is an isometric view of another embodiment of a vehicle light system 200 coupled to a hitch receiver 12 at the rear of a vehicle 10, in accordance with aspects the present inventive concept. FIGS. 9-14 show different views of the light system 100 of FIG. 8. In particular, FIG. 9 is a front view, FIG. 10 is a rear view; FIG. 11 is a top view, FIG. 12 is a bottom view, FIG. 13 is a left side view, and FIG. 14 is a right side view of the vehicle light system of FIG. 8. Unless otherwise indicated, the discussion with respect to the embodiment of FIGS. 1-7 applies to the embodiment of FIGS. 8-14.

The vehicle light system 200 comprises a frame 210, one or more lights 220, and a hitch post 230. The frame 210 includes a center member 212, a right member 214A, and a left member 214A. The frame 210 may also contain extensions 216A and 216B, which may be used to support the one or more lights 220. In various embodiments, each of the right and left extensions 216A, B can be attached by a hinge to respective right and left members 214A, B, so the right and left extensions 216A, B can fold down against the right and left extensions 214A, B, as an example.

One or more reflectors 218 can optionally be included, e.g., attached to one or more surfaces of the frame 210. That is, various portions of the system, such as the center member 212, right and left members 214A, B, extension members 216A, B, and hitch post/receiver 230/240 can also include reflectors or lights 218, in various embodiments.

The one or more lights 220 can include two sets of lights 222A and 222B, which can be connected to the frame 210 by respective connectors 224A and 224B. The connectors 224A, B may allow physical manipulation of the lights for selectively directing the illumination of each. In this embodiment, each light is repositionable, e.g., can be tilted and/or rotated, to optimize light coverage of an area at night, such as a work or rescue area. In FIGS. 8, 11, and 12, the lights 222A, B have been rotated so that they diverge. See for example, how two lights on the same extension 216A, B diverge with respect to a center axis A.

In this embodiment, the two sets of lights 222A, B are each provided on a respective extension member 216A, B. Each set of light can have its own light switch 215A, B (see FIGS. 11, 13, 14 and 15), where the two lights in each set of lights is controlled by a common light switch. In this case, lights 222A are controlled by switch 215A and lights 222B are controlled by light switch 215B. In yet other embodiments, when a set of lights includes more than one light, each light can have its own switch (see, e.g., FIG. 15). In its simplest form, the switch can be an on/off toggle or rocker switch.

In some embodiments, the one or more lights 220, or each light or set of lights within the one or more lights, can take different states, e.g., on, off, strobe, different colors, and so on, as discussed above. The switch or switches 215A, B can transition the light or set of lights from state to state. In some embodiments, the light system 200 can optionally include a mode switch that sets the mode or state of the lights, such as on/off, strobe, and so on.

In some embodiments, the extension members 216A, B can be foldable or collapsible arms, e.g., that fold down toward the left and right vertical members. In such embodiments, the extension members 216A, B can be attached to right and left members 214A, B by hinges 215A, 215B, respectively, as shown in FIGS. 8 and 9.

In this embodiment, the frame 210 is structured such that the lights 222A, B are mounted at a height above the ground that is higher than the license plate area 8 of the vehicle 10. In fact, in this embodiment the height of the lights is greater than the height of the lights in the embodiment of FIGS. 1-7, as an example.

In this embodiment, the center member 212 can be about the width of a vehicle (e.g., truck), e.g., can have a width in a range of about 4' to 6'. Although, the light system 200 is not limited to this range. The height of the light system 200 can be 3' to 5' from hitch post 230 to lights 220, in various embodiments. Again, the light system 200 is not limited to this range, e.g., the right and left members 214A, 214B can make the overall system taller than 5'. Preferably, the center member 212 is oriented above the hitch post/receiver 230/240 but near or below the bottom of the bumper, so that the center member 212 does not block back-up sensors of the vehicle, which are typically integrated into the bumper. In the depicted embodiments, a separation of the lights is as much or more than a width of the center member 212, so could also be separated by a width (or distance) in a range of about 4' to 6'. In various embodiments, the left and right extension members 216A, 216B can be 6" to 18" long, and are preferably about 12" long in this embodiment.

Therefore, as shown and described, one difference between the light system 200 of FIGS. 8-14 and the light system 100 of FIGS. 1-7 is that the light system 200 includes a longer center member 212. In this embodiment, the length of the center member is chosen to expose, i.e., not obstruct, the rear of the vehicle. In such embodiments, including the embodiment shown, a trunk, tailgate, bed, or door at the rear of the vehicle is unobstructed by the light system 200. For example, the rear of the vehicle is unobstructed by the frame 210.

Another difference of the light system 200 of FIGS. 8-14 when compared to the light system 100 of FIGS. 1-7 is that light system 200 includes the hitch post 230 and a hitch receiver. This can be implemented by including a hitch post extension as part of the light system 200 instead of merely a hitch post, such as hitch post 130 in light system 100 of FIGS. 1-7. Hitch post extensions are generally known in the art, such a 7" hitch post extension and a 12" hitch post extension. In some embodiments, a hitch post extension can be made integral with the light system 200 through welding or some other securing process or apparatus. For example, a hitch post extension could be welded to the center member 212.

The hitch post extension includes a hitch post 230 end configured to attach to a trailer hitch receiver of the vehicle 10 and a receiver 240 end configured to receive a hitch post of a trailer hitch or towable apparatus. As a result, even though the light system 200 may consume the existing hitch receiver 12 of the vehicle 10, the vehicle 10 can still pull other equipment by utilizing the hitch receiver 240 of the light system 210.

As examples, the hitch receiver 240 gives the user the ability to tow a compressor, generator, camper, or other apparatus, within the weight restrictions of the vehicle's tow package. As a result, the user need not lug around a separate set of lights to do night work, since the light system 200 enables the simultaneous towing of other equipment.

Therefore, the built-in receiver 240 allows the system to be used as an intermediate tow receptacle, between the vehicle 10 and another towable apparatus, e.g., trailer, generator, compressor, and so on. This allows the system to be a multi-purpose product, where the user does not lose the ability to tow something when the light system 200 is coupled to the vehicle's hitch receiver 12. Thus, the user never has to disconnect the light system 200 to tow something else.

As will be appreciated by those skilled in the art, having the benefit of this disclosure, the light system 100 of FIGS. 1-7 could also be configured to include a hitch receiver.

Figure 15:
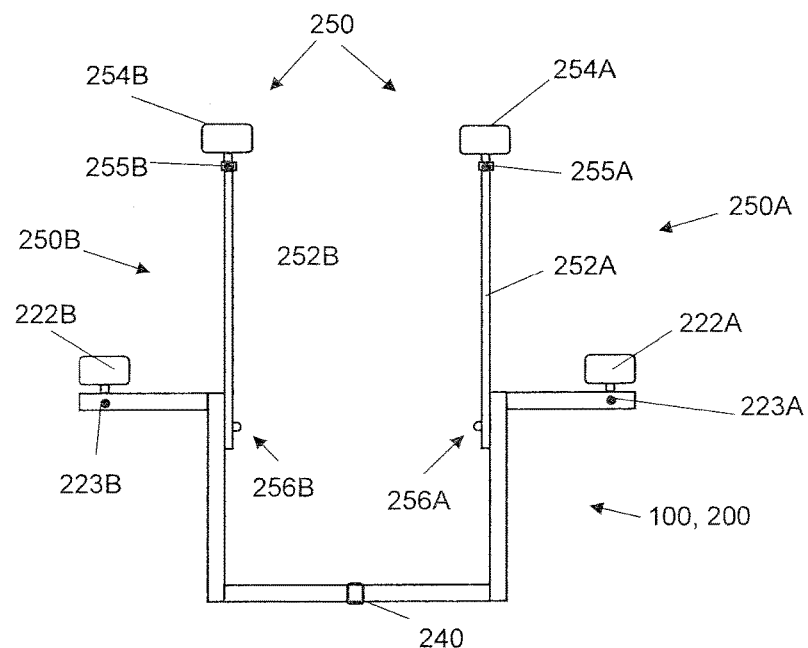
FIG. 15 is an illustration of a front view of the light system of FIG. 1 with optional work lights, in accordance with aspects of the inventive concept.

FIG. 15 is an illustration of a front view of the light support 100 or 200, with optional work lights 250, in accordance with aspects of the inventive concept. The work light 250 can optionally be wired into the supplied plug or connector of the light system, have a separate power cord, be solar power, be battery operated, or obtain power by other means.

In the embodiment of FIG. 15, there is a right work light 250A and a left work light 250B. The right and left work lights 250A, B include light support bars 252A, B, respectively. In this embodiment, the vertical bars can be about 36" in length, but they are not inherently limited to such a dimension.

Each vertical bar 252A, B supports at least one light, such as lights 254A, B. Lights 254A, B can be attached to respective vertical bars 252A and 252B by a manipulatable connectors 255A, B, such as those described above.

The right and left work lights 250A, B include clamps or brackets 256A, B that are useful for attaching the light support bars 252A, B to the frame 110, 210 of the light system 100, 200. In various embodiments, the frame 110, 210 of the light system 100, 200 and/or the light support bars 252A, B can be configured to enable the right and left work lights 250A, B to be attached at different heights.

The lights 254A,B can be wired into the plug and attached to the "marker light" prong of a standard RV connector, so that the lights 254A,B turn on when the marker lights of the vehicle turn on. The vehicle 10 can be running or shut off, and if LED style lights are used there will be limited draw in the vehicle's system.

In this example, each of lights 254A, B is be independently controlled, e.g., via a dedicated switch 255A, B. Also in this example, the lights 222A, B of the light system are controlled by individual switches 223A, 223B, such that each switch 223A, 223B can operate a single light 222A, B.

Figure 16:
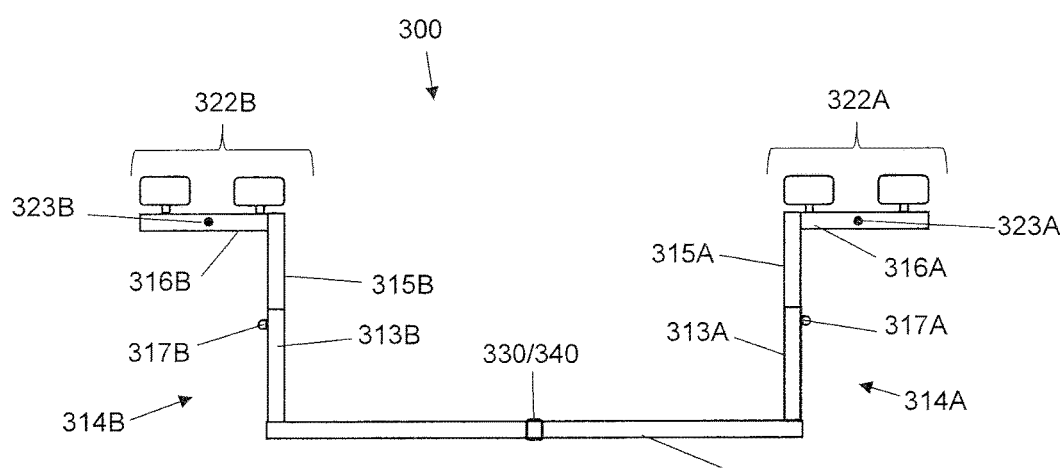
FIG. 16 is schematic drawing of yet another embodiment of a light system, in accordance with aspects of the inventive concept.

FIG. 16 is schematic drawing of yet another embodiment of a light system 300, in accordance with aspects of the inventive concept. This embodiment is similar to the embodiment of FIGS. 1-7 and the embodiment of FIGS. 8-14, except here the right and left members are extendible so that the lights can be selectively positioned at different heights.

The light system 300 includes a center member 312 and extendible right and left members 314A and 314B, which are extendible between a first (lowered) positioned and one or more extended (raised) positons 315A and 315B. The light system 300 can optionally include right and left extensions 316A, B, as discussed above. A hitch post or hitch post/receiver 240 combination is also included, as discussed above.

One or more lights are included. Here, a first set of lights 322A is mounted on the right extension 316A and controlled by a common switch 323A. Similarly, a second set of lights 322B is mounted on the left extension 316B and controlled by a common switch 323B.

In this embodiment, the right member 314A includes a bottom portion 313A fixed to a right portion of the center member 312. A top portion 315A is extendible from the bottom portion 313A. Similarly, the left member 314B includes a bottom portion 313B fixed to a left portion of the center member 312. A top portion 315B is extendible from the bottom portion 313B.

In the example shown, spring-locks 317A and 317B are used to enable each top portion 315A, B to be independently raised, lowered, and locked in place with respect to its bottom portion 313A, B. In other embodiments, other types of mechanisms could be used to selectively adjust and secure the extendible members 315A, B.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A light system, comprising:
   a frame, comprising:
      a central member; and
      left and right members extending upward from the central member;
   one or more lights coupled to the left and right members;
   a hitch post extending from the frame in a first direction and configured to mount to a first hitch receiver of a vehicle; and
   a second hitch receiver extending from the frame and configured to receive a hitch post of a towable apparatus.

2. The system according to claim 1, further comprising: an insulated power cord having a first end coupled to the one or more lights and a second end having a plug configured to connect to a power source of the vehicle.

3. The system according to claim 1, wherein an orientation of the one or more lights is adjustable.

4. The system according to claim 1, wherein at least one light is coupled to each of the left and right members.

5. The system according to claim 1, wherein the one or more lights comprise halogen lights and/or LED lights.

6. The system according to claim 1, wherein the one or more lights is a plurality of lights, including one or more independently controllable lights.

7. The system according to claim 1, wherein the one or more lights is a plurality of sets of lights, including one or more independently controllable sets of lights.

8. The system according to claim 1, wherein the one or more lights are configured to be illuminated in one or more of a plurality of states, including an on state, one or more strobe states, one or more color states, one or more flashing states, and/or one or more illumination pattern states.

9. The system according to claim 1, further comprising:
at least one reflector coupled to the frame.

10. The system according to claim 1, wherein the frame defines an opening between the left and right members that avoids occlusion of a license plate of the vehicle when the hitch post is coupled to the hitch receiver of the vehicle.

11. The system according claim 1, further comprising:
a swivel attachment configured to rotate the frame with respect to the hitch post.

12. The system according to claim 11, wherein the swivel attachment is configured to rotate the frame toward a ground surface when the hitch post is coupled to the hitch receiver of the vehicle.

13. The system according to claim 1, wherein the center member is a substantially horizontally oriented when the hitch post is coupled to the hitch receiver of the vehicle.

14. The system according to claim 13, wherein the left and right members extend from the center member in a substantially vertical direction with respect to the center member.

15. The system according to claim 1, wherein the center member has a width in a range of about 4 feet to 6 feet.

16. The system according to claim 1, wherein the left and right members are extendible between a first position and one or more extended positions.

17. The system according to claim 1, wherein the left and right members respectively comprise left and right extensions, each of the left and right extensions including at least one light.

18. The system according to claim 1, further comprising:
one or more work lights, including at least one light coupled to a support member and at least one clamp that couples the support member to the frame.

19. A vehicle light system, comprising:
a frame, comprising:
a substantially horizontal central member; and
left and right members extending upward from the central member;
a hitch receiver extending from the frame in a first direction and configured to receive a hitch post of a towable apparatus;
a hitch post extending from the hitch receiver in the first direction and configured to mount to a hitch receiver of a vehicle;
one or more lights coupled to the left and right members;
an insulated power cord having a first end coupled to the one or more lights and a second end having a plug configured to connect to a power source of the vehicle; and
at least one switch configured to selectively control the illumination of the one or more lights,
wherein the frame defines an opening between the left and right members that avoids occlusion of a license plate of the vehicle when the hitch post is coupled to the hitch receiver of the vehicle.

20. The system of claim 19, wherein the left and right members are extendible between a first position and one or more extended positions.

* * * * *